Patented July 5, 1932

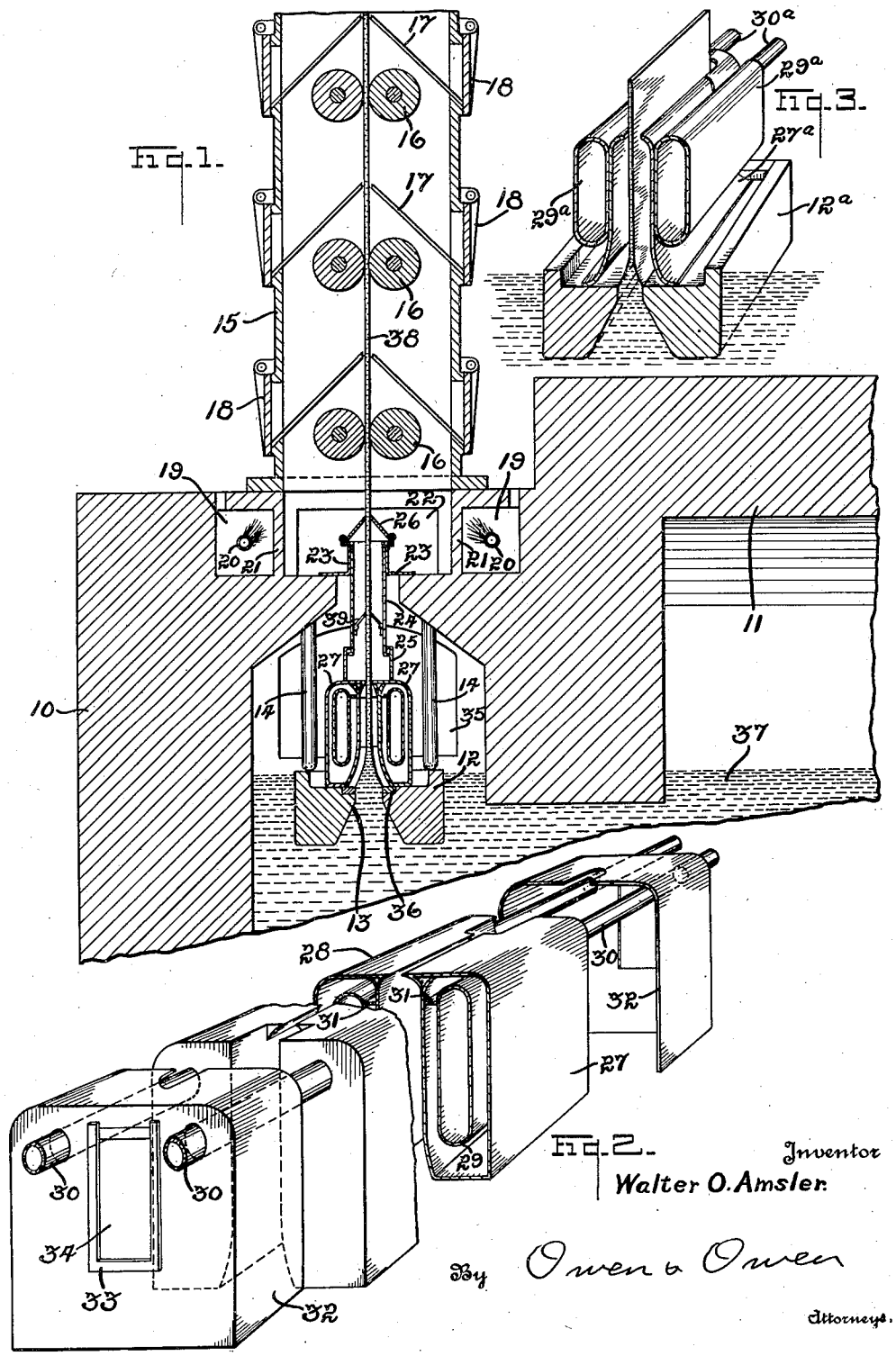

1,865,811

UNITED STATES PATENT OFFICE

WALTER O. AMSLER, OF TOLEDO, OHIO, ASSIGNOR TO SIMPLEX ENGINEERING COMPANY, OF WASHINGTON, PENNSYLVANIA, A CORPORATION OF DELAWARE

GLASS DRAWING

Application filed June 20, 1929. Serial No. 372,300.

This invention relates to drawing glass and more particularly to reducing the waves in drawn glass to a minimum. The manner in which this is accomplished will appear more fully as the description proceeds.

In the accompanying drawing forming a part of this specification, Figure 1 is a partial vertical section of apparatus embodying one form of my invention; Fig. 2 is an isometric view with parts broken away of the cooler illustrated in Figure 1; Fig. 3 is a view of an alternative form of cooler.

The invention is illustrated in connection with apparatus of the well-known Fourcault type. In the construction shown, the dog house 10 receiving molten glass from the melting furnace 11 is provided with a float 12 having therein a slot 13. The float is depressed to the desired extent by plungers 14 which are vertically adjustable by any desired means, not shown. Above the dog house there is provided a leer 15 having elevating rollers 16. Deflecting plates 17 are provided to divide the leer into chambers and to deflect any broken glass to side doors 18. The top of the dog house just beneath the leer is provided with chambers 19 in which there are burners 20 which heat the thin walls 21 adjacent the bottom of the annealing chamber. In the sides of the top of the dog house there are provided removable blocks or doors 22 through which angle irons 23 may be introduced. These angle irons support a telescopic shield composed of an upper portion 24 and a lower portion 25. Plates 26 hinged to the upper end of the shield substantially close the top of the space within the shield.

Resting upon float 12 at the sides of slot 13 there are cooler casings 27 and 28. Within each of these casings there is a water cooler 29 fed by pipes 30. Means, not shown, is preferably provided for fixing the pipes in desired angular relation so that the bottoms of the coolers may be swung towards or from the path of the glass. Partitions 31 are provided between the upper ends of the water coolers and the inner walls of the casings. The ends of the casings are covered with caps 32 which may be provided with slideways 33 for observation windows 34. The ends of the dog house are provided with removable blocks or doors 35, through which the float, coolers, etc., may be introduced, and which may be provided with the usual observation openings. The upper edges of slot 13 are preferably provided with plates 36 of some material which is a good conductor of heat, nichrome being one suitable material.

In starting the operation of the device, the float is first introduced into the dog house with the cooler casing and shield removed. The chamber in the dog house above the glass is then thoroughly heated until it becomes of substantially uniform temperature, whereafter it is allowed to cool sufficiently to come to substantially working temperature. Thereafter angle irons 23 are introduced through doors 22 and shield 24, 25 is placed in position on these irons. A suitable bait is then lowered through the leer and shield until it is properly imbedded in the molten glass 37 in slot 13. After the glass is properly connected to the bait, the bait is raised, the feeder block is depressed to give the required amount of glass and after the bait has been raised into the shield the cooler casing with the water coolers therein is positioned upon the float. The cooler casing rests against the float and the bottom end 25 of the shield rests on the casing so that currents of air are substantially eliminated. The drawing of the glass is then continued to form a sheet 38.

Glass drawn by this general method has not been found to be perfectly even, but has irregular or wavy surfaces. The principal reason for these waves is variation in the plasticity of different portions of the sheet of glass where it is being drawn to final thickness. The plasticity of the glass varies rapidly with changes in temperature and, therefore, anything which causes variations in the temperature of the glass at different places in its width results in variations in the thickness of the glass because it stretches out more where it is warmer than at points where it is cooler. Also, any variation in the temperature of the glass from time to time at any point in the path through which the glass is drawn results in thickening or thinning the glass as it is drawn past such points.

In addition to the above, the thickness of the glass is also affected by the adhesion of the glass to the edges of the slot of the float. Any variation in temperature along these edges varies the adhesion of the glass thereto and results in varying the thickness of the glass. This last mentioned difficulty is largely avoided by the plates 36 which are of good heat conducting material so that they maintain substantially the same temperature condition throughout their length and thereby maintain the condition of the glass where it leaves the slot substantially uniform throughout the width of the sheet.

Where air in contact with the glass is allowed to form convection currents, these currents are inevitably irregular and constantly changing and result in temperature changes in the glass which in turn create waves. The construction disclosed is devised to reduce any such convection currents to the minimum. In the first place, the cooler casings are lowered to contact with the float and the shield above the cooler contacts with the cooler so that no drafts of outside air are admitted to the glass until after it is substantially set. In the next place, the walls of the cooler casing are arranged in as close proximity to the glass as may be done without danger of contact therewith and the water coolers proper are spaced from the walls of the casing. The water coolers could not be placed in such close proximity to the glass without too rapid cooling, and in the absence of the casing between the water cooler and the glass there is a comparatively wide space in which convection currents are set up by the great difference in temperature between the surface of the glass and the surface of the cooler. By providing the casing between the glass and the cooler, the air which contacts the cooler is prevented from coming into direct contact with the glass and thereby the effect of convection currents is reduced. Partitions 31 between the cooler and the casing prevent the air from passing upwardly in this space and creating currents in this way which render the temperature at different points variable.

The glass is rapidly approaching its final condition before it enters the shield, but the provision against drafts in the shield further safeguards the condition of the glass until it finally enters the leer. If desired, additional partitions such as doors 39 may be hinged to the walls of shield in order to subdivide the space within the shield and further reduce convection currents in contact with the glass.

In the construction shown in Figure 3, members 27ª rest upon the float 12ª and are interposed between the water coolers 27ª and the glass and act to cut off the drafts of outside air and to reduce the convection currents and thereby assist in reducing the waves in the glass. However, a construction such as shown in Figures 1 and 2 is preferred as it provides a more complete guard against convection currents. The cooling effect of coolers 29 in a construction such as shown in Figures 1 and 2 can be varied by swinging the bottoms of the coolers towards or from the path of the glass.

While one form of the invention has been disclosed in considerable detail and one alternative form has been indicated, it will be readily understood that other changes may be made within the scope of the appended claims.

What I claim is:

1. In apparatus for drawing sheet glass, a container for molten glass, a float in said container having a slot through which glass is drawn, and means providing a substantially air-tight casing creating a dead air space around the path of the glass from said slot for the distance through which the glass is cooled to a set condition.

2. In apparatus for drawing sheet glass, a container for molten glass, a float in said container having a slot through which glass is drawn and means providing a substantially air-tight casing creating a dead air space around the path of the glass from said slot for the distance through which the glass is cooled to a set condition, the walls of said casing being in close proximity to the glass during the greater part of the path through which the glass is plastic.

3. In apparatus for drawing sheet glass, a container for molten glass, a float in said container having a slot through which glass is drawn, means providing a substantially air-tight casing creating a dead air space around the path of the glass from said slot for the distance through which the glass is cooled to a set condition, and water coolers adjacent the walls of the casing surrounding the plastic portion of the glass.

4. In apparatus for drawing sheet glass, a container for molten glass, a float in said container having a slot through which glass is drawn, means providing a substantially air-tight casing creating a dead air space around the path of the glass from said slot for the distance through which the glass is cooled to a set condition, and water coolers adjacent the walls of the casing surrounding the plastic portion of the glass, said coolers being adjustable towards and from the walls of the casing.

5. In apparatus for drawing sheet glass, a container for molten glass, a float in said container having a slot through which glass is drawn, means providing a substantially air-tight casing around the path of the glass from said slot for the distance through which the glass is cooled to a set condition, water coolers adjacent the walls of the casing surrounding the plastic portion of the glass, and a substantially air-tight partition between the upper portions of the water coolers and the adjacent walls of the casing.

6. In apparatus for drawing sheet glass, a container for molten glass, a float in the container provided with a slot, means above the container for drawing a sheet of glass, a casing resting against the top of the float about the slot and containing coolers, and a shield resting against the upper side of the casing, said shield and casing providing a substantially air-tight passage through which the glass sheet is drawn.

7. In apparatus for drawing sheet glass, a container for molten glass and means providing a slot from which glass is drawn, and means providing a substantially air-tight casing with walls so closely adjacent to the path of the glass from said slot for the distance through which the glass is cooled to a set condition so as to provide a substantially dead air space.

In testimony whereof I have hereunto signed my name to this specification.

WALTER O. AMSLER.